(12) United States Patent
Jammalamadaka et al.

(10) Patent No.: US 8,231,177 B2
(45) Date of Patent: Jul. 31, 2012

(54) FOLDING HEAD RESTRAINT MECHANISM

(75) Inventors: Sai Prasad Jammalamadaka, Novi, MI (US); Arjun V. Yetukuri, Rochester Hills, MI (US); Gerald S. Locke, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/775,990

(22) Filed: May 7, 2010

(65) Prior Publication Data
US 2010/0219670 A1    Sep. 2, 2010

Related U.S. Application Data

(62) Division of application No. 11/680,517, filed on Feb. 28, 2007, now abandoned.

(51) Int. Cl.
*A47C 7/36* (2006.01)

(52) U.S. Cl. ......................................... 297/408

(58) Field of Classification Search .................. 297/61, 297/408
See application file for complete search history.

(56) References Cited

U.S. PATENT DOCUMENTS

| | | | | |
|---|---|---|---|---|
| 830,826 | A * | 9/1906 | De Fontes | 297/404 |
| 4,113,309 | A * | 9/1978 | Brockway | 297/408 |
| 4,351,563 | A * | 9/1982 | Hattori | 297/408 |
| 4,640,549 | A * | 2/1987 | Yokota | 297/410 |
| 4,834,456 | A | 5/1989 | Barros et al. | |
| 5,145,233 | A | 9/1992 | Nagashima | |
| 5,669,668 | A | 9/1997 | Leuchtmann | |
| 5,992,937 | A * | 11/1999 | Pilhall | 297/408 |
| 6,302,485 | B1 * | 10/2001 | Nakane et al. | 297/408 |
| 6,612,653 | B2 | 9/2003 | Takata | |
| 6,631,956 | B2 | 10/2003 | Mauro et al. | |
| 6,860,564 | B2 | 3/2005 | Reed et al. | |
| 6,880,890 | B1 | 4/2005 | DeBrabant | |
| 6,910,740 | B2 | 6/2005 | Baker et al. | |
| 6,926,367 | B2 | 8/2005 | Tomimatsu | |
| 6,935,696 | B2 | 8/2005 | Gauthier et al. | |
| 6,983,995 | B1 | 1/2006 | Veine et al. | |
| 7,234,778 | B1 * | 6/2007 | Toba | 297/403 |
| 7,322,646 | B2 | 1/2008 | Jammalamadaka et al. | |

(Continued)

FOREIGN PATENT DOCUMENTS

DE    202006008841 U1    8/2006

(Continued)

OTHER PUBLICATIONS

Office Action in corresponding German case dated May 27, 2009, 2 pgs.

(Continued)

*Primary Examiner* — David Dunn
*Assistant Examiner* — David E Allred
(74) *Attorney, Agent, or Firm* — Brooks Kushman P.C.

(57) ABSTRACT

A foldable head restraint assembly includes a mounting subassembly, a structural shell, and a locking plate. The mounting subassembly supports the structural shell and includes a first support post, a second support post, a cross member, and a latch rigidly. The cross member is attached to the first and second support posts and to the latch. The folding motion of the head restraint is initiated by movement of the locking plate which is positionable at a first plate position for engaging the latch and at a second plate position for releasing the latch. The structural shell is pivotable about the mounting subassembly when the latch plate is in the second plate position.

19 Claims, 4 Drawing Sheets

U.S. PATENT DOCUMENTS

| | | | |
|---|---|---|---|
| 7,984,951 B2 * | 7/2011 | Sayama | 297/408 |
| 8,083,291 B2 * | 12/2011 | Yoshida | 297/408 |
| 2005/0156456 A1 | 7/2005 | Robinson | |
| 2007/0164593 A1 * | 7/2007 | Brockman | 297/408 |
| 2007/0284929 A1 | 12/2007 | Keller et al. | |
| 2007/0296260 A1 | 12/2007 | Stossel | |
| 2010/0001570 A1 * | 1/2010 | Sayama | 297/410 |
| 2010/0026074 A1 * | 2/2010 | Sayama | 297/408 |
| 2010/0072803 A1 * | 3/2010 | Sayama | 297/408 |
| 2010/0078972 A1 * | 4/2010 | Sayama | 297/61 |
| 2010/0109412 A1 * | 5/2010 | Sayama | 297/409 |
| 2010/0283305 A1 * | 11/2010 | Yetukuri et al. | 297/408 |
| 2011/0095592 A1 * | 4/2011 | Willard et al. | 297/408 |
| 2011/0175421 A1 * | 7/2011 | Grable | 297/408 |

FOREIGN PATENT DOCUMENTS

| | | | |
|---|---|---|---|
| EP | 1190893 A2 * | 3/2002 | |
| JP | 359186746 A * | 10/1984 | |

OTHER PUBLICATIONS

English Abstract corresponding to DE 20 2006 008 841 U1.

* cited by examiner

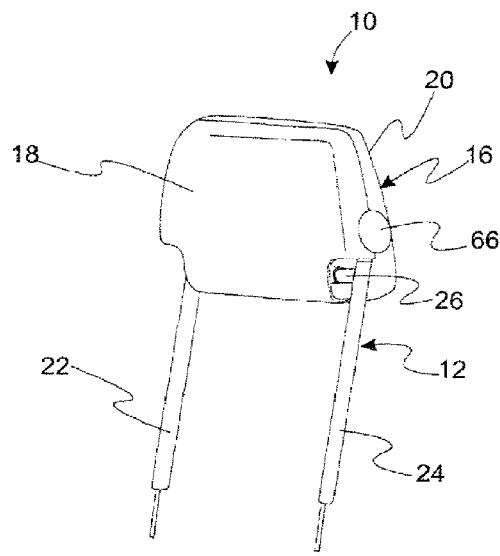
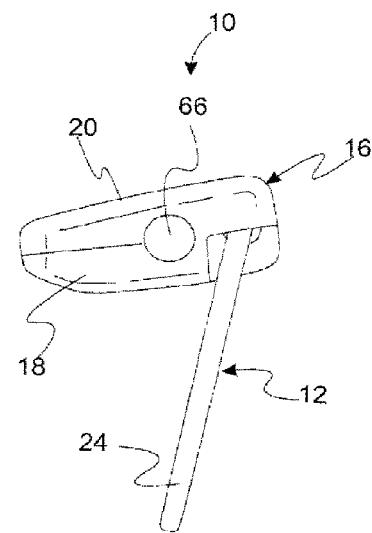
Figure 1A          Figure 1B
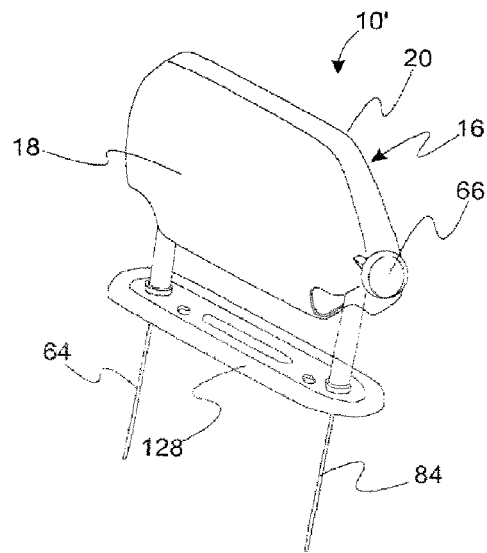
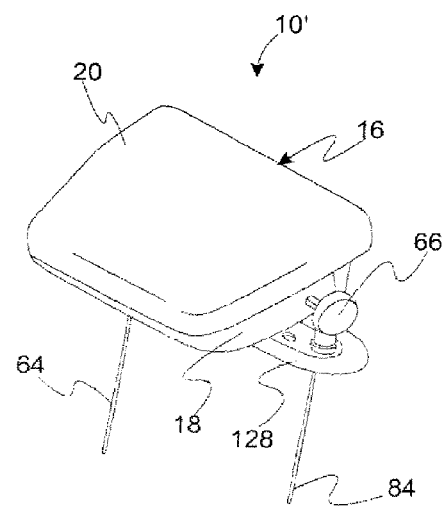
Figure 6A          Figure 6B

FOLDING HEAD RESTRAINT MECHANISM

CROSS-REFERENCE TO RELATED APPLICATIONS

This application is a division of U.S. application Ser. No. 11/680,517, filed Feb. 28, 2007, now abandoned, the disclosure of which is incorporated in its entirety by reference herein.

BACKGROUND OF THE INVENTION

1. Field of the Invention

The invention relates to head restraints for vehicle seats, more particularly to adjustable head restraints.

2. Background Art

Adjustable head restraints for vehicle seats are provided for comfort and safety of an occupant. For example, U.S. Pat. No. 6,631,956 B2, which issued on Oct. 14, 2003, discloses an adjustable head restraint with a rod that supports the head restraint and translates relative to sleeves of the seatback.

Another offering of the prior art is a head restraint that is adjustable on posts that extend from the seatback. The posts are received within receptacles of the seatback and the posts are also adjustable relative to the receptacles. The head restraint includes a detent mechanism for maintaining a position of the head restraint relative to the posts; and the receptacles include a locking mechanism for locking the posts relative to the receptacles. Moreover, some variations of the prior art head restraints allow folding. Although these head restraints of the prior art work reasonably well, the mechanism for folding tend to be complicated and expensive.

Accordingly, for at least these reasons, designs for improved head restraint folding mechanism are desirable.

SUMMARY OF THE INVENTION

The present invention solves one or more problems of the prior art by providing in at least one embodiment a foldable head restraint assembly that is moveable from a first head restraint position to a second head restraint position. The head restraint assembly includes a mounting subassembly, a structural shell, and a locking plate. The structural shell is supported by the mounting subassembly. The mounting subassembly includes a first support post, a second support post, a cross member, and a latch. The cross member has a first end attached to the first support post and a second end attached to the second support post. Moreover, the latch is attached to the cross member. The folding motion of the head restraint is initiated by movement of the locking plate. The locking plate is positionable at a first plate position for engaging the latch and at a second plate position for releasing the latch. Advantageously, the structural shell is pivotable about the mounting subassembly when the latch plate is in the second plate position.

BRIEF DESCRIPTION OF THE DRAWINGS

FIG. 1A is a perspective view showing an embodiment of a head restraint in an upright position;

FIG. 1B is a perspective view showing an embodiment of a head restraint in an folded position;

FIG. 6A is a perspective view showing an embodiment of a head restraint adapted to be attached to a seat back frame in an upright position; and FIG. 6B is a perspective view showing an embodiment of a head restraint adapted to be attached to a seat back frame in an folded position.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 2A:
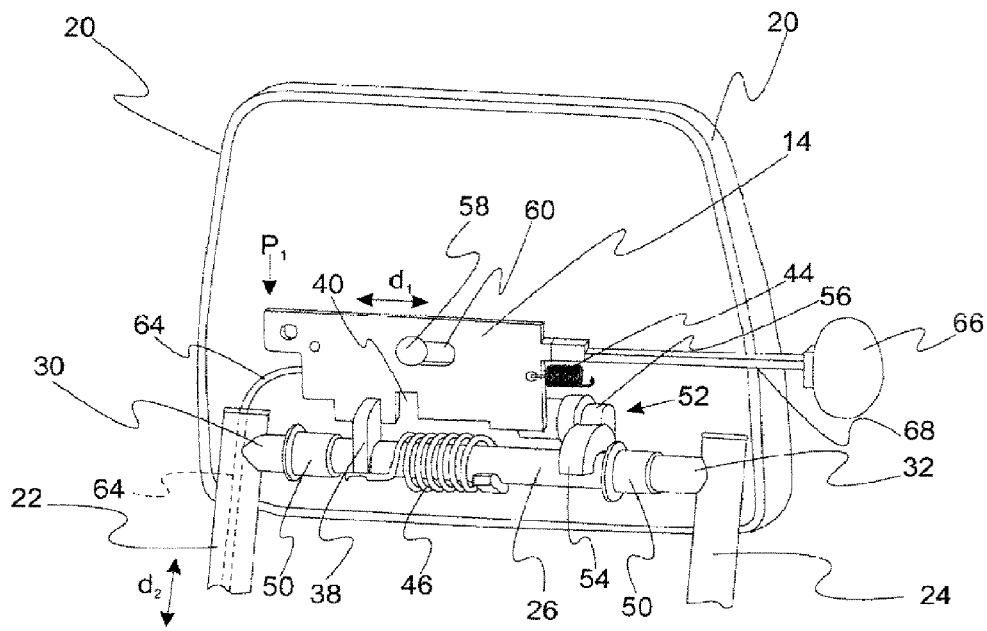
FIG. 2A is a schematic illustration of showing the interior of a head restraint support structure utilizing an embodiment of the folding mechanism of the present invention in a locked state.
Figure 2B:
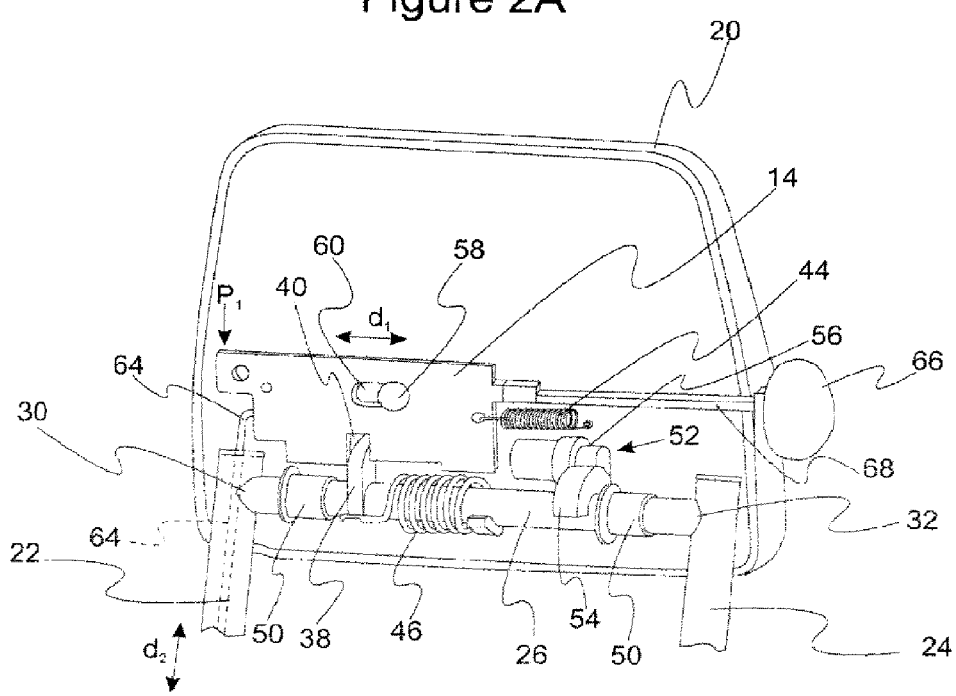
FIG. 2B is a schematic illustration of showing the interior of a head restraint support structure utilizing an embodiment of the folding mechanism of the present invention in a released state.

With reference to FIGS. 1A, 1B, 2A, and 2B, schematic illustrations showing a head restraint support structure utilizing an embodiment of the folding mechanism of the present invention is provided. FIG. 1A is a perspective view showing the head restraint in a upright position. FIG. 1B is a perspective view showing the head restraint in a folded position. FIG. 2A is a schematic illustration of a section showing the interior of a head restraint support structure utilizing the folding mechanism in a locked state. FIG. 2B is a schematic illustration of a section showing the interior of a head restraint support structure utilizing the folding mechanism in a released state. Head restraint assembly 10 includes mounting subassembly 12, locking plate 14, and structural shell 16. Structural shell 16 include shell sections 18, 20. Mounting subassembly 12 is moveably attached to structural shell 16 thereby allowing movement from the folded to the upright positions and vice versa. Mounting subassembly 12 includes first support post 22, second support post 24, and cross member 26. First support post 22 and second support post 24 are each attached to cross member 26. In a variation of the present embodiment, support posts 22, 24 are each cylindrically shaped. In a further refinement, one or both of support posts 22, 24 is substantially hollow or includes hollow sections. In another refinement, support posts 22, 24 are adapted to be positioned in receptacles in a vehicle seat back. In such refinements, the height of the head restraint is often adjustable. Similarly, in another variation of the present embodiment, cross member 26 is also cylindrically shaped. In a further refinement, cross member 26 is substantially hollow or includes hollow sections. In other variations, support posts 22, 24 and cross member 26 are substantially solid (i.e., non-hollow) or include solid sections. Cross member 26 has first end 30 which is attached to first support post 22 and second end 32 which is attached to second support post 24. In still other variations, first support post 22 and second support post 24 are bent (e.g., doglegged). Mounting subassembly 12 also includes latch 38 which is rigidly attached to cross member 26.

It should be appreciated, that is some variations, head restraint assembly 10 is designed to fold towards the front of a vehicle including the head restraint assembly. In other variations, head restraint assembly 10 is designed to fold towards the rear of a vehicle including the head restraint assembly.

In the specific variation depicted in FIGS. 2A and 2B, translation movement of locking plate 14 along direction $d_1$ is used to engage and disengage latch 38 from locking plate 14. When locking plate 14 is in first plate position $P_1$, locking plate 14 engages latch 38 thereby preventing movement (i.e., pivoting) of structural shell 16 relative to mounting subassembly 12. When locking plate 14 is at second plate position $P_2$, locking plate 14 is released because locking plate 14 does not physically engage latch 38 since latch 38 is now able to pass through slot 40. Structural shell 16 is pivotable about mounting subassembly 12 when locking plate 14 is in the second plate position $P_2$. Locking plate biasing member 44 acts to move locking plate 14 from second plate position $P_2$ to first plate position $P_1$. In one refinement, locking plate biasing member 44 is a spring. Accordingly, locking plate 14 will automatically return to second plate position $P_1$ when latch 38 is not positioned within slot 40. In a refinement, head restraint assembly 10 includes head restraint biasing member 46. Head restraint biasing member 46 acts to move structural shell 16 from the upright to the folded position when locking plate 14 is at second plate position $P_2$. In another refinement, head restraint assembly 10 further includes one or more bearings 50. Cross member 26 has a section positioned within one or more bearings 50 thereby allowing rotation of one or more bearings 50 about cross member 26 when locking plate 14 is in the second plate position $P_2$. In some variations, bearings 50 are split bearings. Bearings 50 are attached to structural shell 16. In still another refinement, head restraint assembly 10 further includes damping mechanism 52. Damping mechanism 52 includes pinion gear 54 which is attached to cross member 26 and damper 56 which is attached to shell section 20. Damping mechanism 52 damps the movement of structural shell 16 when pivoting from the upright to the folded position thereby allowing such movement proceed smoothly. Guide post 58 which is positioned in slot 60 restricts and guides the movement of locking plate 14.

Locking plate 14 may be translated between first plate position $P_1$ and second plate position $P_2$ by any number of mechanisms. In one refinement, translation of locking plate 14 is accomplished via pull cable 64 which is pulled by a user along direction $d_2$. In another refinement, cable 64 passes through support post 22. In some enhancements of this refinement, the top of support post 22 is open. In another refinement, a user presses button assembly 66 which cause movement of push rod 68 along direction $d_1$ thereby causing translation of locking plate 14.

Figure 3:
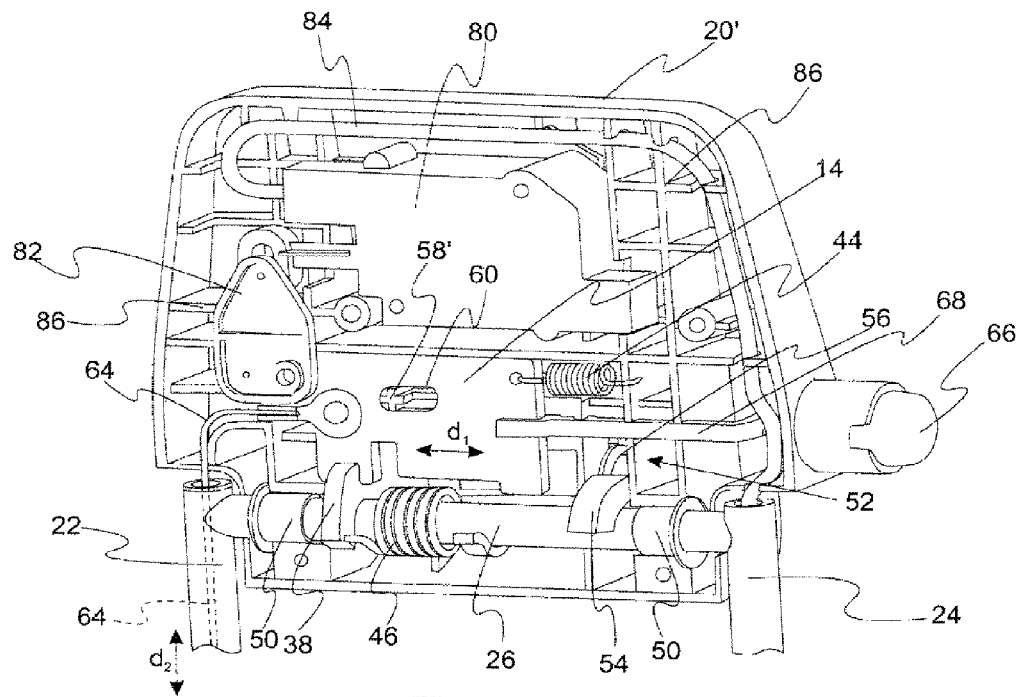
FIG. 3 is a schematic illustration of a head restraint assembly using an actuator to effect movement of locking plate.

With reference to FIG. 3, a schematic illustration of a head restraint assembly using an actuator is provided. The head restraint assembly depicted in FIG. 3 is of the general construction set forth above. In this variation, head restraint assembly actuator 80 is mounted into structural shell section 20'. When activated, actuator 80 moves armature 82 in a manner that translates locking plate 14 along direction $d_1$ thereby moving locking plate 14 from second plate position $P_1$ to second plate position $P_2$. A user activates actuator 80 via a control signal carried thereto via cable 84. In some refinement, a wireless receiver is used to generate this control signal. It should be appreciated, that one or more of the mechanisms for translating between first plate position $P_1$ and second plate position $P_2$ may simultaneously be employed in a head restraint assembly. FIG. 3 also illustrates the use of ribs 86 to hold the internal components of head restraint assembly 10 in place and/or to improve the rigidity of shell sections 18, 20.

Figure 4A:
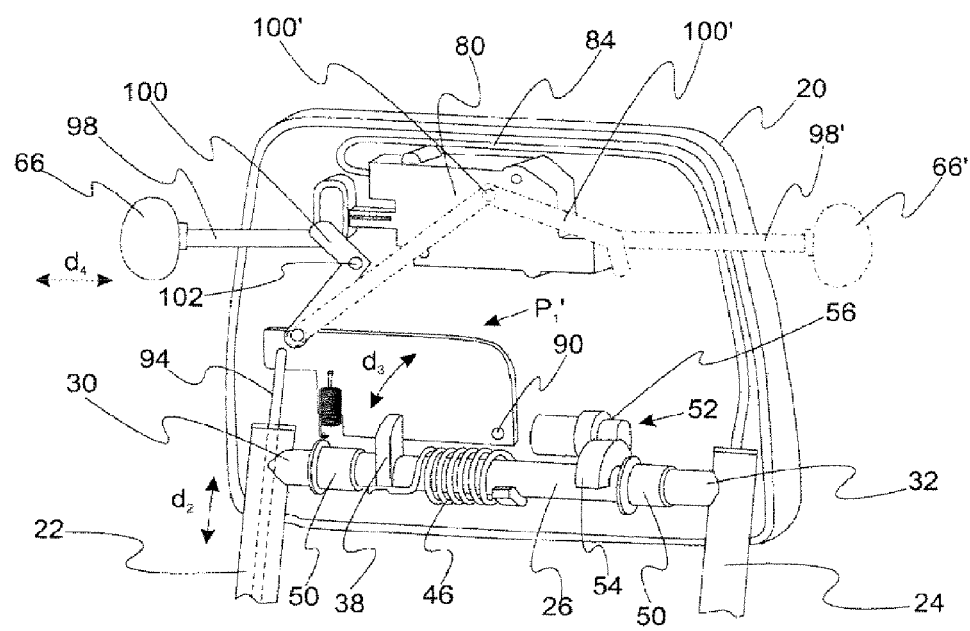
FIG. 4A is a schematic illustration showing the interior of a head restraint support structure utilizing a pivotable locking plate in a locked state.
Figure 4B:
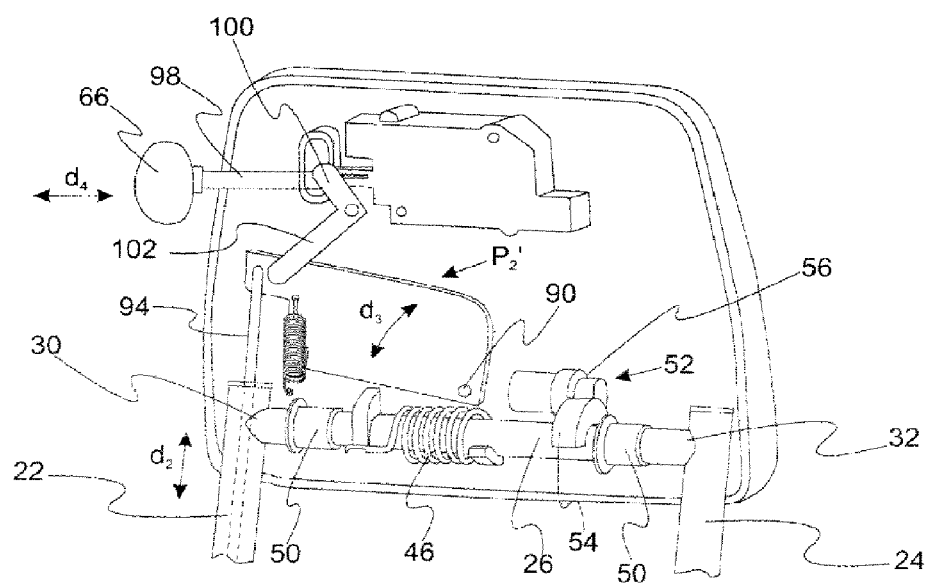
FIG. 4B is a schematic illustration showing the interior of a head restraint support structure utilizing a pivotable locking plate in a released state.

With reference to FIGS. 4A and 4B, schematic illustrations of a variation of a head restraint assembly using a pivotable locking plate are provided. FIG. 4A is a schematic illustration showing the interior of a head restraint support structure utilizing a pivotable locking plate in a locked state. FIG. 4B is a schematic illustration showing the interior of a head restraint support structure utilizing a pivotable locking plate in a released state. As set forth above, head restraint assembly 10 includes mounting subassembly 12, locking plate 14, and structural shell 16. Structural shell 16 include shell sections 18, 20. Mounting subassembly 12 is moveably attached to structural shell 16 thereby allowing movement from the folded to the upright positions and vice versa. Mounting subassembly 12 includes first support post 22, second support post 24, and cross member 26. First support post 22 and second support post 24 are each attached to cross member 26. In a variation of the present embodiment, support posts 22, 24 are each cylindrically shaped. In a further refinement, one or both of support posts 22, 24 is substantially hollow or includes hollow sections. Similarly, in another variation of the present embodiment, cross member 26 is also cylindrically shaped. In a further refinement, cross member 26 is substantially hollow or includes hollow sections. In other variations, support posts 22, 24 and cross member 26 is substantially solid (i.e., non-hollow) or include solid sections. Cross member 26 has first end 30 which is attached to first support post 22 and second end 32 which is attached to second support post 24. Mounting subassembly 12 also includes latch 38 which is rigidly attached to cross member 26.

Still referring to FIGS. 4A and 4B, pivoting of locking plate 14' along direction $d_3$ (about pivot point 90) is used to engage and disengage latch 38 from locking plate 14'. When locking plate 14' is in first plate position $P_1'$, locking plate 14' engages latch 38 thereby preventing movement (i.e., pivoting) of structural shell 16 relative to mounting subassembly 12 from the upright position to the folded position. When locking plate 14' is at second plate position $P_2'$, locking plate 14' is released because locking plate 14' does not physically engage latch 38. Structural shell 16 is pivotable about mounting subassembly 12 when locking plate 14' is in the second plate position $P_2$. Locking plate biasing member 44' acts to move locking plate 14' from second plate position $P_2'$ to first plate position $P_1'$. In one refinement, locking plate biasing member 44' is a spring. Accordingly, locking plate 14' will automatically return to first plate position $P_1'$ when locking plate 14' is not blocked by latch 38. In a refinement, head restraint assembly 10 includes head restraint biasing member 46. Head restraint biasing member 46 acts to move structural shell 16 from the upright to the folded position when locking plate 14' is at second plate position $P_2$. In a variation, pivot point 90 is proximate to a corner of locking plate 14'. That is, pivot point 90 is towards the opposite side than the attachment point of plate biasing member 44'. In another refinement, head restraint assembly 10 further includes one or more bearings 50. In some variations, bearings 50 are split bearings. Cross member 26 has a section positioned within one or more bearings 50 thereby allowing rotation of one or more bearings 50 about cross member 26 when locking plate 14 is in the second plate position $P_2$. Bearings 50 are attached to structural shell 16. In still another refinement, head restraint assembly 10 further includes damping mechanism 52. Damping mechanism 52 includes pinion gear 54 which is attached to cross member 26 and damper 56 which is attached to shell section 20. Damping mechanism 52 damps the movement of structural shell 16 when pivoting from the upright to the folded position thereby allowing such movement to proceed smoothly.

Still referring to FIGS. 4A and 4B, head restraint assembly 10 is depicted with several mechanisms to initiate movement of locking plate 14' from first plate position $P_1$ to second plate position $P_2$. In one refinement, push rod 94 moves along direction $d_3$ thereby causing pivoting of locking plate 14'. In another refinement, a user presses button assembly 66 which causes movement of push rod 98 along direction $d_4$ thereby causing pivoting of locking plate 14' via movement of armature 100 about pivot point 102. In yet another refinement, actuator 80 effects movement of armature 100 thereby causing pivoting of locking plate 14'. Also depicted in FIG. 4A in phantom view is a variation in which placement of a button in on the other side of the head restraint. In this variation, button assembly 66' is in communication with locking plate 14'. In a refinement, this communication is accomplished used push rod 98' and armature 100' which pivots about pivot point 102'.

Figures 5A, 5B:
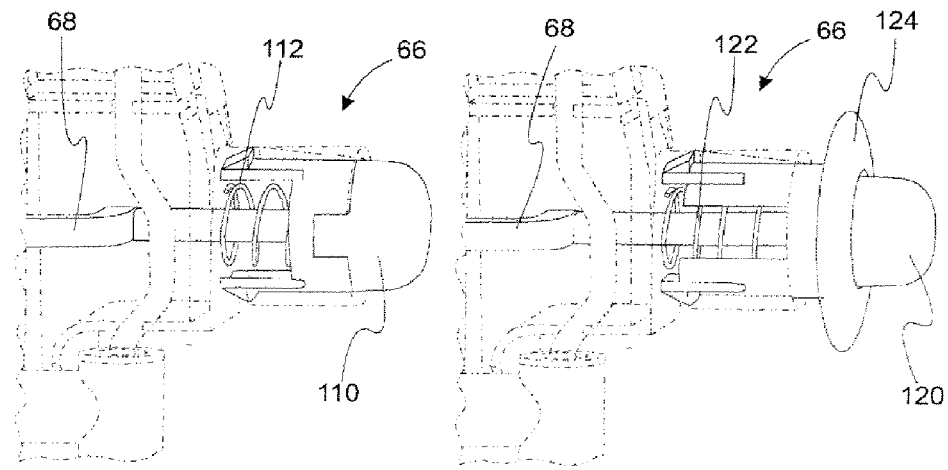
FIG. 5A is a schematic illustration of a button assembly designed for placement under the head restraint trim.
FIG. 5B is a schematic illustration of a button assembly designed for placement with a portion protruding through the head restraint trim.

With reference to FIGS. 5A and 5B, schematic illustrations of variations for button assembly 66 are provided. FIG. 5A provides an illustration of a button designed for placement under the head restraint trim. In this variation, push button section 110 is in communication with the locking plate via push rod 68. Spring 112 allows for push button section 110 to recoil after operation by a user. FIG. 5B provides an illustration of a button designed for placement such that a portion protrudes through the head restraint trim. In this variation, push button section 120 is in communication with the locking plate via push rod 68. Spring 122 allows for push button section 120 to recoil after operation by a user. A portion of push button section 120 protrudes through bezel 124.

With reference to FIGS. 6A and 6B, schematic illustrations of a head restraint assembly adapted to be attached to a seat back frame are provided. FIG. 6A is a perspective view showing an embodiment of a head restraint adapted to be attached to a seat back frame in an upright position. FIG. 6B is a perspective view showing an embodiment of a head restraint adapted to be attached to a seat back frame in an folded position. In a refinement of this variation, plate 128 assists with the attachment of head restraint assembly 10' to the vehicle seat back.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A head restraint assembly comprising:
   a mounting subassembly comprising:
     a first support post;
     a second support post;
     a cross member having a first end attached to the first support post and a second end attached to the second support post the cross member forming a first pivot axis extending lengthwise laterally between the first and second support posts; and
     a latch rigidly attached to the cross member, and
   a locking plate having a planar face that is substantially parallel to the first axis, the locking plate positionable at a first plate position for engaging the latch on the planar face of the locking plate and at a second plate position for releasing the latch, the locking plate being movable from the first plate position to the second plate position by pivoting about a pivot point on a second pivot axis substantially perpendicular to the first pivot axis, the second pivot axis intersecting the locking plate proximate to a corner of the locking plate wherein the second pivot axis is centrally located in a lateral direction relative to the mounting subassembly, an actuation mechanism engages the locking plate on an actuation end of the locking plate distal from the second pivot axis, and a locking plate biasing member is attached to the locking plate at a location between the corner and the actuation end of the locking plate; and
   a structural shell supported by the mounting subassembly, the structural shell pivotable about the first pivot axis when the locking plate is in the second plate position.

2. The head restraint assembly of claim 1 further comprising:
   a head restraint biasing member that acts to move the head restraint assembly from a first head restraint position to a second head restraint position when the locking plate is in the second plate position; and
   a locking plate biasing member that acts to move the locking plate into the first plate position.

3. The head restraint assembly of claim 2 wherein the head restraint biasing member is a biasing spring.

4. The head restraint assembly of claim 2 wherein the locking plate biasing member is a biasing spring.

5. The head restraint assembly of claim 1 wherein the first support post, the second support post, and the cross member are each independently hollow or includes hollow sections.

6. The head restraint assembly of claim 1 wherein the first support post, the second support post, and the cross member are each independently solid or include solid sections.

7. The head restraint assembly of claim 1 further comprising a damping mechanism that damps movement of the structural shell when pivoting from an upright position to a folded position.

8. The head restraint assembly of claim 1 further comprising a user operated button assembly wherein operation of the button assembly causes pivoting of the locking plate.

9. A head restraint assembly comprising:
a mounting subassembly comprising:
  a first support post;
  a second support post;
  a cross member having a first end attached to the first support post and a second end attached to the second support post the cross member forming a first pivot axis extending lengthwise laterally between the first and second support posts; and
  a latch rigidly attached to the cross member, and
a locking plate having a planar face that is substantially parallel to the first axis, the locking plate positionable at a first plate position for engaging the latch on the planar face of the locking plate and at a second plate position for releasing the latch, the locking plate being movable from the first plate position to the second plate position by pivoting about a pivot point on a second pivot axis substantially perpendicular to the first pivot axis, the second pivot axis intersecting the locking plate proximate to a corner of the locking plate wherein the second pivot axis is centrally located in a lateral direction relative to the mounting subassembly, an actuation mechanism engages the locking plate on an actuation end of the locking plate distal from the second pivot axis, and a locking plate biasing member is attached to the locking plate at a location between the corner and the actuation end of the locking plate;
a structural shell supported by the mounting subassembly, the structural shell pivotable about the first pivot axis when the locking plate is in the second plate position;
a locking plate biasing member that acts to move the locking plate into the first plate position; and
a damping mechanism that damps movement of the structural shell when pivoting from an upright position to a folded position.

10. The head restraint assembly of claim 9 further comprising a head restraint biasing member that acts to move the head restraint assembly from a first head restraint position to a second head restraint position when the locking plate is in the second plate position.

11. The head restraint assembly of claim 9 wherein the locking plate biasing member is a spring.

12. The head restraint assembly of claim 9 wherein the first support post, the second support post, and the cross member are each independently hollow or includes hollow sections.

13. The head restraint assembly of claim 9 wherein the first support post, the second support post, and the cross member are each independently solid or include solid sections.

14. The head restraint assembly of claim 9 further comprising a user operated button assembly wherein operation of the button assembly causes pivoting of the locking plate.

15. A head restraint assembly comprising:
a mounting subassembly comprising:
  a first support post;
  a second support post;
  a cross member having a first end attached to the first support post and a second end attached to the second support post the cross member forming a first pivot axis extending lengthwise laterally between the first and second support posts; and
  a latch rigidly attached to the cross member, and
a locking plate having a planar face that is substantially parallel to the first axis, the locking plate positionable at a first plate position for engaging the latch on the planar face of the locking plate and at a second plate position for releasing the latch, the locking plate being movable from the first plate position to the second plate position by pivoting about a pivot point on a second pivot axis substantially perpendicular to the first pivot axis, the second pivot axis intersecting the locking plate proximate to a corner of the locking plate, wherein the second pivot axis is centrally located in a lateral direction relative to the mounting subassembly, an actuation mechanism engages the locking plate on an actuation end of the locking plate distal from the second pivot axis, and a locking plate biasing member is attached to the locking plate at a location between the corner and the actuation end of the locking plate;
a structural shell supported by the mounting subassembly, the structural shell pivotable about the first pivot axis when the locking plate is in the second plate position;
a head restraint biasing spring that acts to move the head restraint assembly from a first head restraint position to a second head restraint position when the locking plate is in the second plate position; and
a locking plate biasing spring that acts to move the locking plate into the first plate position.

16. The head restraint assembly of claim 15 wherein the first support post, the second support post, and the cross member are each independently hollow or includes hollow sections.

17. The head restraint assembly of claim 15 wherein the first support post, the second support post, and the cross member are each independently solid or include solid sections.

18. The head restraint assembly of claim 15 further comprising a damping mechanism that damps movement of the structural shell when pivoting from an upright position to a folded position.

19. The head restraint assembly of claim 14 further comprising a user operated button assembly wherein operation of the button assembly causes pivoting of the locking plate.

* * * * *